March 4, 1924.
C. RAEBER
MACHINE FOR CUTTING STUMPS
Filed Dec. 27, 1922  4 Sheets-Sheet 1
1,485,527
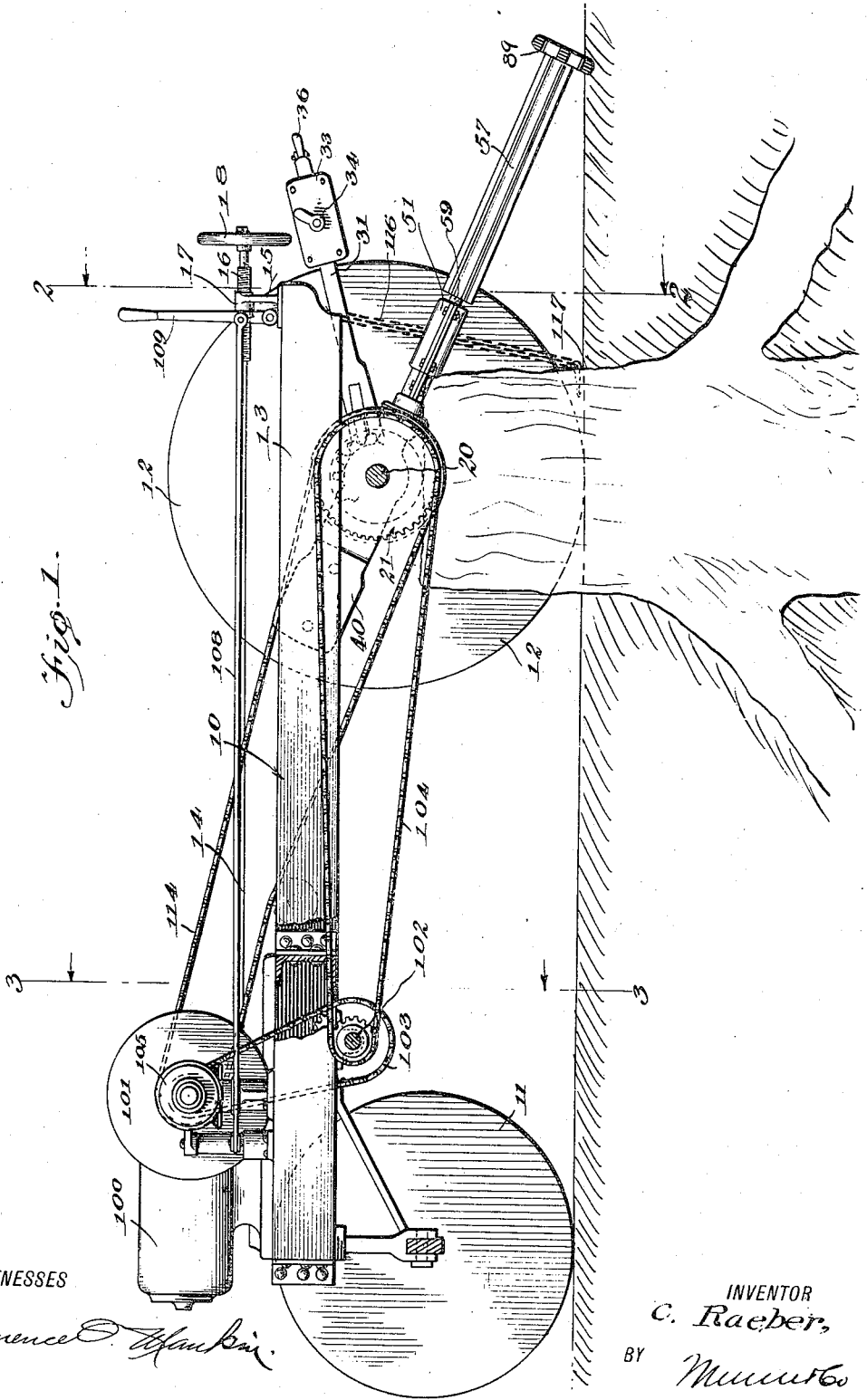
WITNESSES
INVENTOR
C. Raeber,
BY
ATTORNEYS

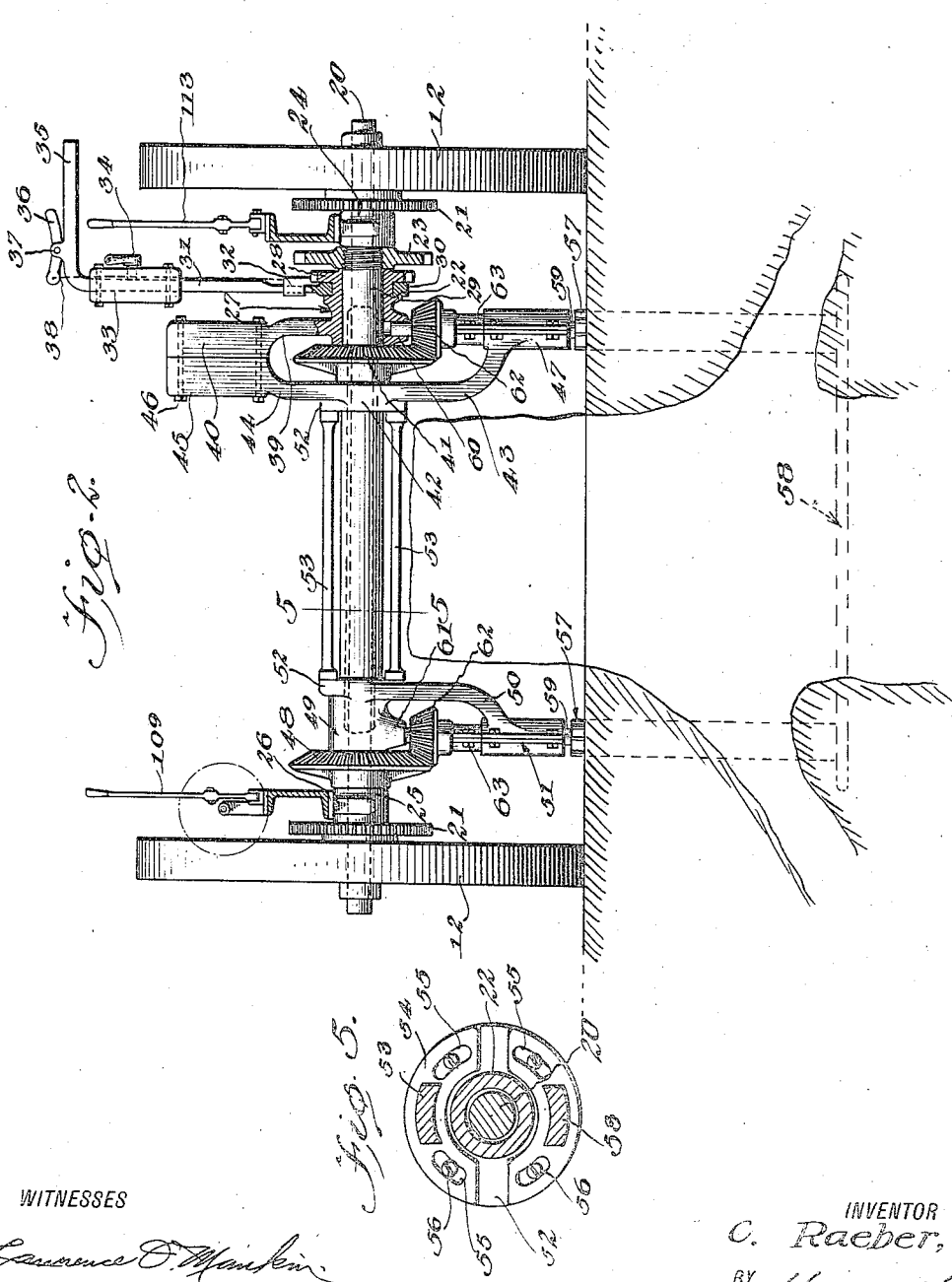

March 4, 1924.
C. RAEBER
MACHINE FOR CUTTING STUMPS
Filed Dec. 27, 1922
1,485,527
4 Sheets-Sheet 3
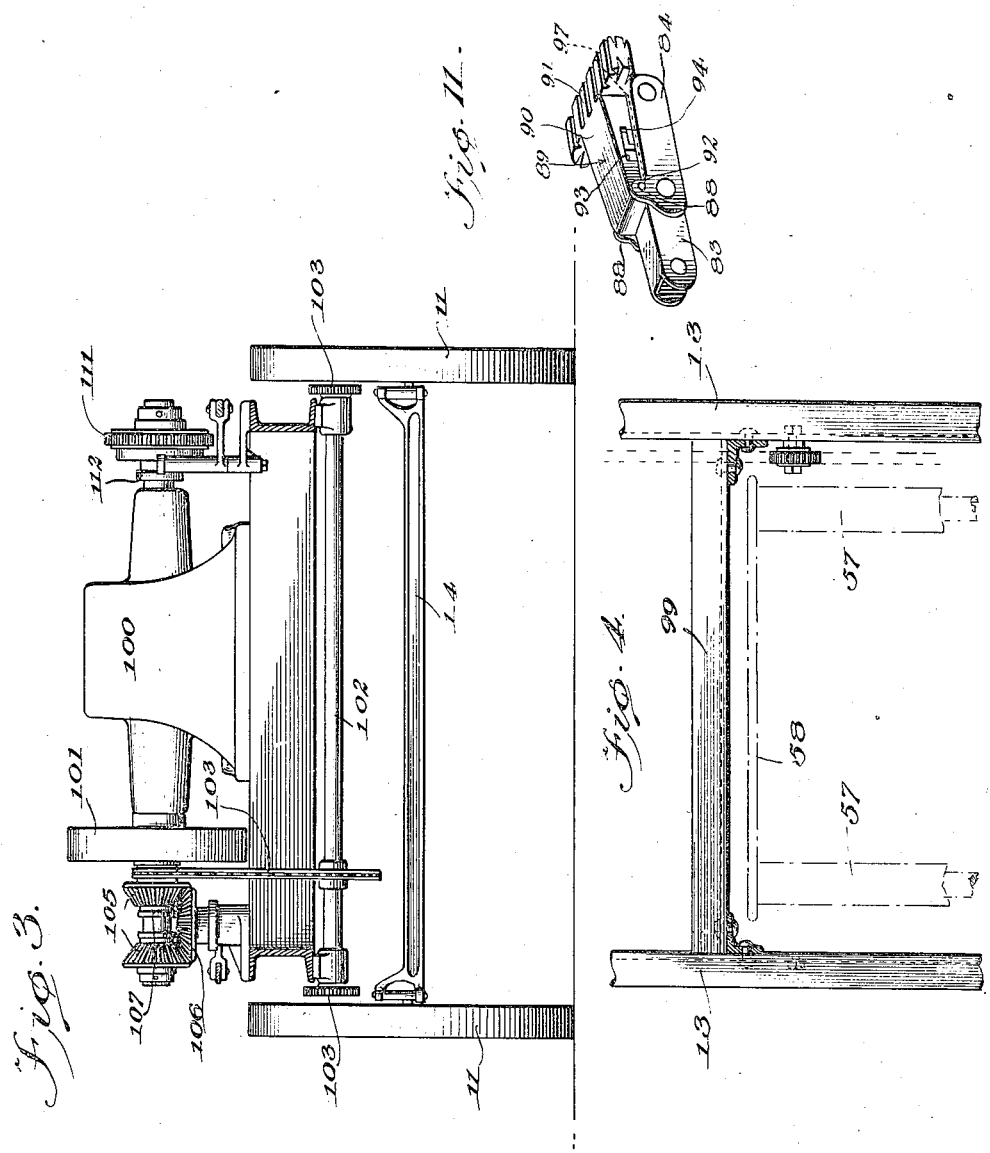
WITNESSES
INVENTOR
C. Raeber,
BY
ATTORNEYS

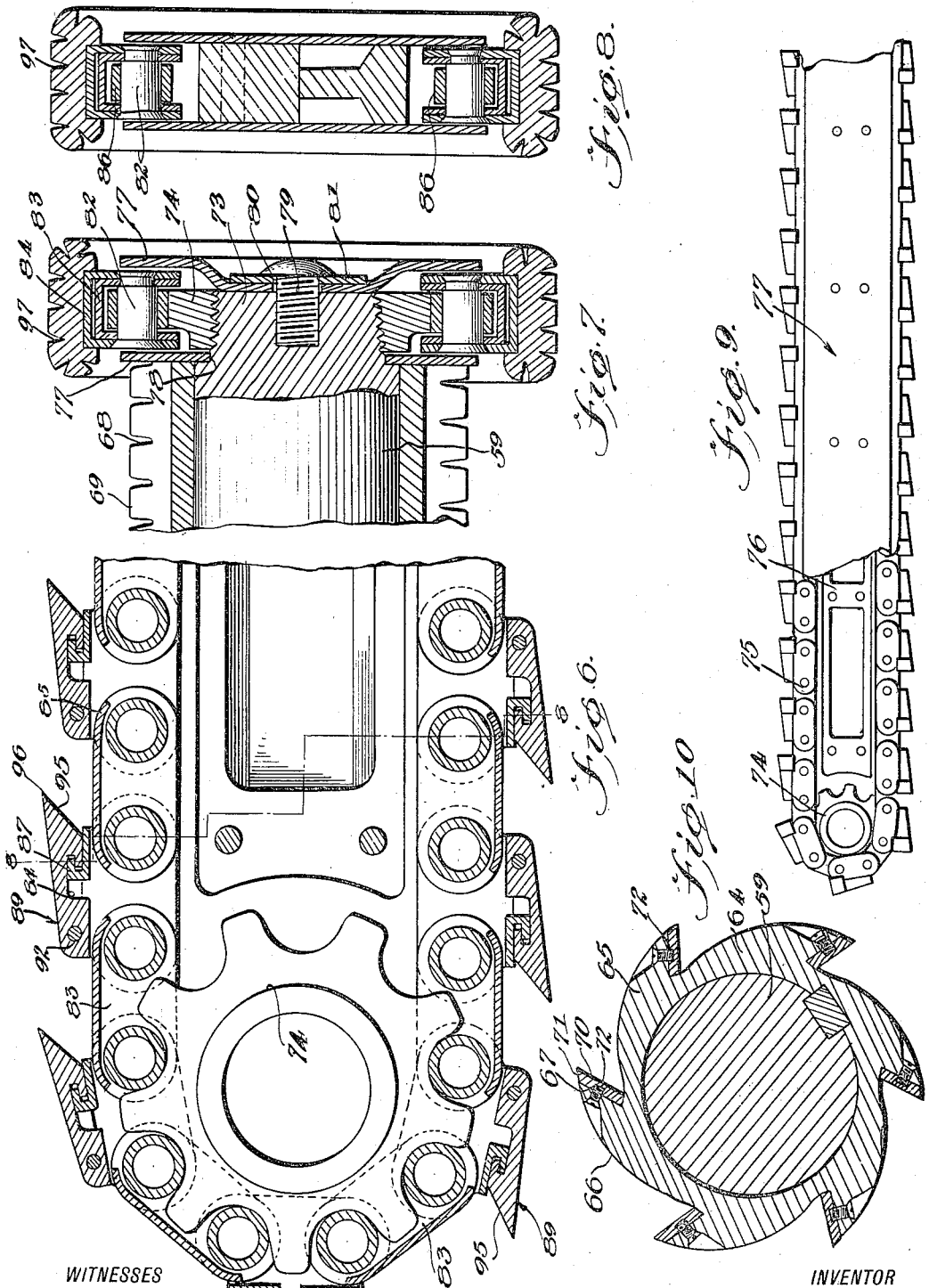

Patented Mar. 4, 1924.

1,485,527

UNITED STATES PATENT OFFICE.

CLEMENS RAEBER, OF SAN ANTONIO, TEXAS.

MACHINE FOR CUTTING STUMPS.

Application filed December 27, 1922. Serial No. 609,261.

*To all whom it may concern:*

Be it known that I, CLEMENS RAEBER, a citizen of the United States, and a resident of San Antonio, in the county of Bexar and State of Texas, have invented certain new and useful Improvements in Machines for Cutting Stumps, of which the following is a specification.

This invention relates to a machine for cutting stumps.

The general object of the invention is to provide a machine of this character which may be utilized for severing a stump and associated roots thereof at a point beneath the soil or earth surrounding said stump.

A further object of the invention is that the machine be equipped with a suitable running gear and power means for operating the same in order to enable the machine to be easily moved from place to place in cutting stumps.

It is also an object of the invention that the machine be adapted to be utilized for removing the stump from the earth after the same has been severed.

A still further object of the invention is that the machine be adapted to operate for severing a stump in a reliable and relatively rapid manner.

It is also an object of the invention that the cutting elements utilized for severing a stump be renewable and thus to lengthen the useful life of the machine.

It is also within the scope of the objects of the invention that the machine be adapted to be easily manipulatel and not subject to getting out of order.

Other objects, and objects relating to details of construction, combination and arrangement of parts will hereinafter appear in the detailed description to follow.

The invention is illustrated by way of example in the accompanying drawings, in which:—

Figure 1 is a view in side elevation of the machine when positioned for operating upon a stump and also showing removed the front and rear wheel occurring upon the same side of the machine in order to more clearly illustrate the invention.

Figure 2 is a sectional view taken substantially on the lines 2—2 of Figure 1.

Figure 3 is a view similar to Figure 2 taken on the line 3—3 of Figure 1.

Figure 4 is a fragmentary plan view taken immediately forward to the axle of the running gear and illustrating the manner in which the stump cutter may revolve entirely within the frame of the running gear.

Figure 5 is a sectional view taken substantially on the lines 5—5 of Figure 2.

Figure 6 is a fragmentary longitudinal sectional view of the horizontally disposed cutter section employed in the apparatus.

Figure 7 is a sectional view taken adjacent one end of the horizontally disposed cutter section and illustrating the manner in which the same is operatively connected with one of the radially disposed cutter sections.

Figure 8 is a transverse sectional view taken through the horinzontally disposed cutter section substantially on the line 8—8 of Figure 6.

Figure 9 is a fragmentary view in side elevation of the horizontally disposed cutter section and with parts broken away to more clearly illustrate the construction of the same.

Figure 10 is a transverse sectional view of one of the radially disposed cutter sections.

Figure 11 is a perspective view of one of the cutter elements and associated links carried by the horizontal cutter section.

The running gear may consist in a frame generally indicated by the reference character 10, the two front or steering wheels 11 and the two rear wheels 12. The frame 10 preferably consists in the two side members 13 which are suitably secured to each other adjacent their forward ends by the means of cross members as best shown in Figure 1. The front wheels 11 may be connected to the front axle 14 in any conventional manner so that these wheels may be utilized for steering the running gear. A rod 14 extends longitudinally of the frame 10 and is turnably supported at its rear end by a bracket 15, said bracket being secured to the frame 10, and the rod 14 having a screw threaded enlarged portion 16 adjacent its rear end adapted to cooperate with suitable screw threads within the collar 17 carried by the bracket 15 whereby with the rotation of said rod the same may be advanced or retracted. The rod 14 has secured to its rear end a hand wheel 18 whereby the same may be manually rotated in either direction and its forward end is suitably connected with the wheels 11 for steering the running gear either in the forward or rearward movement thereof.

The rear wheels 12 are journaled upon opposite ends of axle 20, and each rear wheel has secured or formed upon the inner side of its hub a cog wheel 21. The shaft 20 turnably supports a hollow axle 22 and said hollow axle being disposed between the two cog wheels 21. The hollow axle 22 has threaded thereon adjacent its one end the hub of a gear wheel 23 and interposed between this gear wheel 23 and associated cog wheel 21 is a collar 24 within which the tubular member 22 may freely rotate. Abutting the other cog wheel 21 is a similar collar 25 and each of the collars 24 and 25 carry a bracket plate upon which the associated side frame member 13 may be secured.

Adjacent the gear wheel 23 there is turnably supported by the tubular member 22 a casting 27, said casting having formed upon its outer periphery and at its end adjacent the gear wheel 23 a ratchet gear 28. Also this casting has formed upon its outer periphery the annular rib 29 which is suitably spaced with respect to the ratchet gear 28 to provide a groove therebetween which is adapted to receive a collar 30. The collar 30 has extending therefrom an arm 31 which slidably supports adjacent its inner end a pawl 32 adapted to be brought into engagement with the ratchet gear 28. The arm 31 also slidably supports a weight 33 which may be adjustably positioned upon said arm by the means of a set screw 34, said set screw being provided with a suitable handle as shown whereby the same may be easily manipulated. The upper end of the arm 31 terminates in a radially extending projection 35 to provide a handle and upon this handle there is pivoted a latch member 36, said latch member being pivotally supported intermediate its ends as at 37 and connected to the pawl 32 by the means of a suitable wire or the like as indicated at 38. Preferably the pawl 32 should be spring pressed so that the same will normally engage with the ratchet gear 28.

The casting 27 is further formed with a radially extending arm 39 which terminates in an enlargement 40. The purpose of this arm and enlargement 40 thereof will later become apparent.

Upon the inner side of the casting 27 there is journaled a bevelled gear 41 and upon the inner side of the hub portion of the bevelled gear 41 there is journaled a casting in the form of a collar 42 having projecting therefrom a pair of arms 43 and 44, the arm 44 terminating in an enlargement 45 similar to the enlargement 40 of the arm 39, and said enlargement 45 being secured to the enlargement 40 by the means of bolts or the like as at 46. The arm 43 terminates in a sleeve generally indicated by the reference character 47, said sleeve preferably being split longitudinally and the parts thereof secured together by bolts or the like as shown.

Adjacent the collar 25 there is secured upon the hollow axle 22 a second bevelled gear 48 and upon the inner side of this bevelled gear there is turnably mounted upon the hollow axle 22 a casting in the form of a collar 49 which is provided with an arm 50 terminating at its free end in a sleeve generally indicated by the reference numeral 51, and said sleeve being similar to the sleeve 47, that is, split longitudinally and the two parts thereof properly bolted together.

Each of the members 49 and 42 has formed upon its inner end an enlargement 52. The arm 50 of the member 49 preferably extends from the enlargement 52 and also the arm 43 extends from the enlargement 52 upon the member 42. Between the members 42 and 49 there is extended a pair of connecting bars 53. Each bar 53 terminates at each end in an arcuate shaped plate 54, said plates being adapted to fit against the enlargements 52. Each plate 54 is provided with a pair of elongated slots 55 and through each slot there is extended a screw bolt 56. As is obvious by this arrangement the relation of the arms 43 and 50 may be adjusted, that is, one of these arms may be advanced with relation to the other or vice versa.

As shown in Figure 2, the cutting unit or apparatus may consist in two radial cutter sections, each being generally designated by the reference numeral 57 and the horizontal cutter section 58. The sections 57 are radial with respect to the hollow axle 22 and the section 58 extends between the free ends of these two radial sections. Each of the cutter sections 57 consists in a shaft 59, one of which is journaled at its upper end in a boss 60 formed upon the casting or collar 27 and the other journaled in a similar boss 61 formed upon the collar or casting 49. Each shaft carries a pinion 62, one of which is in constant mesh with the bevelled gear 48 and the other in constant mesh with the bevelled gear 41. The sleeve 51 upon the end of the arm 50 journals the shaft 59 associated with the casting 49, while the sleeve 47 journals the similar shaft associated with the casting 27 and between each bevelled gear 62 and the associated sleeve 47—51 there is interposed a split collar 63.

Upon the outer end portion of each shaft 59 there is secured a sleeve 64 which is formed with a plurality of longitudinally extending ribs 65 as best shown in Figures 7 and 10. Each rib has an outer arcuate shaped surface as at 66 and is provided with a forward inclined face as at 67. Each rib is provided with a plurality of notches as at 68, Figure 7, whereby to provide teeth 69 and each tooth 69 having secured upon its forward face a plate 70 which is bevelled as at 71 in order to give a cutting edge and also that the top surface of the plate will correspond with the similar surface of the associated tooth. These plates may be termed "cutters" and each cutter is detachably secured by the means of a set screw or the like as at 72.

The lower end of each shaft 59 extends from the similar end of the associated sleeve 64 and this extended portion is reduced as at 73, Figure 7. Upon this reduced portion 73, in each instance, there is threaded the hub of a sprocket wheel 74 and over these sprocket wheels there passes a continuous sprocket chain 75. Between the sprocket wheels there is interposed a frame generally designated by a reference numeral 76, Figure 9. This frame is held in position by a pair of plates 77, the reduced portion 73 of each shaft 59 extends through a suitable opening in the inner plate 77 and this reduced portion of each shaft 59 is provided with an offset as at 78 whereby to journal the associated end of the plate 77. Each shaft 59 is also rotatably connected to the outer plate 77 by the means of a bolt 79, said bolt, in each instance, extending loosely through a suitable opening as at 80 in the outer plate 77 and being threaded into the end of the shaft 59. Also a washer plate 81 may be interposed between the head of each bolt 79 and the associated plate 77.

The sprocket chain 75 consists in a plurality of pins 82 and alternate journal links for said pins as designated at 83 and 84 respectively. As best shown in Figure 11, each link 83 is in the form of a channel clip having its bridge portion curved at each end thereof as indicated at 85. Each link 84 is also in the form of a channel clip and within which the links 83 may fit. The pins 82 pivotally connect in each instance the opposing ends of a pair of adjacent links 83 and 84 as illustrated to advantage in Figures 6, 7 and 8. Each pin is provided with a collar 86 to withstand the wear to which the same may be subjected from the sprocket wheels 74.

As best shown in Figure 11, the bridge portion of each link 84 is removed and the remaining portion has formed therewith an L-shaped upstanding lug 87. Also each link 84 is provided with a pair of ears 88 between which there is pivoted the one end of a cutter tooth 89. Each cutter tooth 89 may consist in a shank portion 90 and the head 91. The shank portion in each instance is pivotally connected to the associated ears 88 by the means of a pin as at 92. The under face of each cutter tooth 89 is provided with a recess 93 which is formed in its forward wall with a slot 94. This slot together with the recess 93 is adapted to receive the L-shaped lug 87 of the associated link 84 and thus to secure the tooth against removal upon this link. In removing one of the teeth 89 the pivot pin 92 should first be removed and then the tooth may be easily detached from the link 84.

The head 91 of each tooth 89 is preferably of the shape shown and its forward face inclined as at 95 to form a cutting edge 96. This cutting edge is preferably provided with a plurality of notches 97. Also it will be observed that the head extends downwardly upon each side of the associated link 84 and that the head is formed upon its bottom surface with a suitable recess in order to receive the forward end portion of the link 84 as best shown in Figures 6, 7 and 8. By this construction the teeth 89 are rigidly held in position.

Referring to Figure 4 there is shown between the side members 13 of the running gear frame 10 a cross member 99 and at the rear of this cross member there is shown in dotted lines a free end portion of the cutter unit. This is particularly to illustrate that the cutter unit may turn entirely about the hollow axle 22 without interference with any part of the running gear.

Upon the forward end of the frame 10 there is mounted an internal combustion engine 100 which is adapted to operate a transversely extending power shaft upon which there is mounted a fly-wheel 101. Beneath the engine 100 there is rotatably supported by the frame 10 a shaft 102 which is connected to the crank shaft of the engine 100 by a sprocket chain 103 through suitable sprocket wheels carried by said crank shaft and the shaft 102. The shaft 102 carries a sprocket wheel at each end thereof which is connected by a sprocket chain 104 with the sprocket wheel 21 of the associated rear wheel 12. The crank shaft of the engine 100 is also provided with a pair of bevelled gears 105 which are connected by a bevelled gear 106, and through the means of the splined collars or the like as indicated at 107 the shaft 102 may be caused to rotate in either direction. A rod 108 is properly connected at its forward end by the means of a bell crank lever as shown whereby to manipulate the clutch members 107, and the rod 108 in turn may be shifted by a lever bar 109.

The crank shaft of the engine 100 carries upon its other end than that theretofore referred to a sprocket wheel 111 which may be connected to the crank shaft by a clutch member 112 and this clutch member may be manipulated by the lever bar 113 to suitable bell crank levers and rods. The sprocket wheel 111 is operatively connected through a chain 114 with the sprocket wheel 23 which in turn is rigidly secured to the hollow shaft 22.

In the use of the present apparatus, the same is brought so that the rear axle thereof will be disposed over a stump as illustrated in Figures 1 and 2. The cutter bars are now brought so that the same may rest upon the earth at the rear of the stump as illustrated in Figure 1, and the weight 33 is adjusted so as to continuously urge the cutters to move about the hollow axle 22. The engine may now be started and power applied through the sprocket chain 114 for rotating the hollow shaft 22 which in turn will rotate the bevelled gears 41 and 48 and which will rotate the shafts 59. These shafts will transmit power for operating the cutter chain 75, that is, for causing movement of this cutter chain and thereby permitting the teeth 89 carried thereby to cut the earth and permit the horizontal section 58 of the cutter to swing forwardly. The teeth 69 of each cutter section 57 will also sever the earth and of course move forwardly with the section 58 The teeth carried by each of the sections 57 and 58 are adapted to sever the roots and therefor the operation of severing the stump, as illustrated in Figures 1 and 2, may be proceeded with at a relatively rapid rate. The cutter bar sections will continue to move until they have entirely severed a stump and then they may be brought to a position as illustrated in Figure 4 of the drawings, that is, within the rear end of the frame 10. Any suitable means may be employed for holding the cutter in this position until it is desired to again use the same.

It is to be noted that the cutter teeth formed on the sleeve 64 have removable plates, namely: the blades or cutters 70. By renewing these cutters at the proper time the cutter sections 57 may be maintained to operate at the highest efficiency. Also if desired, similar removable cutters or blades may be provided for the lugs 89 carried by the sprocket chain 75, in which case the chain link and the lug 89 may be one piece of malleable iron or cast steel and the cutter blade screwed on to it.

Referring to Figure 1 there is shown a chain 116 which is connected at its one end to the rear end of the frame 10 and its other end provided with a suitable dog 117 which may be driven into the stump being operated upon, as shown. If this chain is drawn taut when applied, the same will hold the stump against downward movement or against pinching the cutter unit during the severing operation of the stump. Also after the stump has been severed the dog 117 may be positioned in the top of the stump and then the running gear used for drawing the stump from the earth and conveying it to the desired place.

While I have shown and described the preferred form of my invention, I wish it to be understood that I am aware of the fact, that the construction, combination and arrangement of parts may be changed by those skilled in the art without departing from the spirit of the invention, as indicated by the appended claims.

I claim:

1. In combination, a horizontally disposed supporting means adapted to be positioned over a stump, a cutter carried by said supporting means including a pair of radially extending sections, and a horizontally disposed section extending between said radially extending sections, said radially extending sections carrying the horizontally disposed cutter being adapted to turn about said supporting means and serve for cutting the stump.

2. In combination, a horizontally disposed supporting means adapted to be positioned over a stump, a pair of rotatable cutter sections extending radially of said supporting means and adapted to be turned about said supporting means, a horizontal cutter section between the outer ends of said radially extending sections, and means for swinging said cutter sections about the supporting means whereby to sever the stump beneath said supporting means.

3. In combination, a horizontally disposed supporting means, a pair of cutter sections extending radially therefrom and turnable about said supporting means, a horizontal cutter section disposed between said radially extending sections, power means whereby said cutter sections may be simultaneously operated, and adjustable means whereby to apply a pressure for turning said radial sections and said horizontal section about the horizontal supporting means and thereby to sever the stump beneath the supporting means.

4. In combination, a running gear, a pair of cutter sections carried by the rear axle of said running gear extending radially from the axle and turnable thereabout, a horizontally disposed cutter section extending between the radially extending sections, power means whereby said cutter sections may be operated simultaneously, and means for constantly urging the cutters to turn about said axle.

5. In combination, a running gear, a pair of cutter sections carried by the rear axle of said running gear extending radially from the axle and turnable thereabout, a horizontally disposed cutter section extending between the radially extending sections, power means whereby said cutter sections may be operated simultaneously, and an adjustable weight whereby to urge the cutter sections to rotate about the axle.

6. In combination, a running gear, a pair of cutter sections supported by the rear axle of said running gear, each cutter section extending radially from said rear axle and turnable thereabout, a third cutter section extending between the outer ends of the radially extending cutter sections, and power means carried by the running gear whereby the cutter sections may be operated simultaneously.

7. In combination, a running gear, a pair of cutter sections supported by the rear axle of said running gear, each cutter section extending radially from said rear axle and turnable thereabout, a third cutter section extending between the outer ends of the radially extending cutter sections, means whereby said cutter sections may be counterbalanced upon said rear axle, and adjustable means for urging said cutter sections to rotate about said axle.

8. In a device of the character described, a cutter comprising a continuous sprocket chain, side frame members between which said sprocket chain may be supported, teeth secured to the links of said sprocket chain and projecting from said frame, said teeth forming a closure between the sides of frame, and means whereby power may be applied for causing a continuous movement of said sprocket chain.

9. In a device of the character described, a cutter comprising a continuous sprocket chain, side frame members within which said sprocket chain may be supported, teeth carried by said chain adapted to bridge the space between the frame members, said teeth projecting from said frame, and means whereby power may be applied for causing a continuous movement of said sprocket chain.

10. In a device of the character described, a horizontally disposed supporting means, a pair of shafts extending radially therefrom and turnable thereabout, a cutter section carried between the outer ends of said shafts comprising a continuous chain, a frame for supporting said chain, teeth carried by said chain and projecting from the frame, and means carried by the shafts whereby to operate said chain, and means whereby said shafts may be rotated for supplying power to drive said chain.

CLEMENS RAEBER.